US011325145B2

(12) United States Patent
Yang et al.

(10) Patent No.: US 11,325,145 B2
(45) Date of Patent: May 10, 2022

(54) SYSTEM FOR DETERMINING SPRAYING INFORMATION USED FOR SPRAYING A THREE-DIMENSIONAL OBJECT

(71) Applicant: ORISOL TAIWAN LIMITED, Fusing Township, Changhua County (TW)

(72) Inventors: Yu-Fong Yang, Fu Hsin Hsian (TW); Yen-Te Lee, Lukang Township (TW); Ching-Wei Wu, Huatan Township (TW); Wei-Hsin Hsu, Chang Hwa Hsien (TW)

(73) Assignee: ORISOL TAIWAN LIMITED, Fusing Township (TW)

( * ) Notice: Subject to any disclaimer, the term of this patent is extended or adjusted under 35 U.S.C. 154(b) by 236 days.

(21) Appl. No.: 16/704,838

(22) Filed: Dec. 5, 2019

(65) Prior Publication Data

US 2021/0008581 A1 Jan. 14, 2021

(30) Foreign Application Priority Data

Jul. 8, 2019 (TW) .................................. 108123898

(51) Int. Cl.
| G06K 9/00 | (2022.01) |
| B05B 12/00 | (2018.01) |
| G06T 7/149 | (2017.01) |
| G06T 7/60 | (2017.01) |
| C09J 5/00 | (2006.01) |
| B05B 12/02 | (2006.01) |

(Continued)

(52) U.S. Cl.
CPC ............ *B05B 12/004* (2013.01); *B05B 12/02* (2013.01); *B05B 12/16* (2018.02); *B05D 1/02* (2013.01); *C09J 5/00* (2013.01); *G06T 7/149* (2017.01); *G06T 7/60* (2013.01); *G06T 2207/10012* (2013.01)

(58) Field of Classification Search
CPC ....... B05B 12/004; B05B 12/02; B05B 12/16; B05B 12/122; G06T 7/149; G06T 7/60; G06T 2207/10012; G06T 7/12; C09J 5/00; B05D 1/02; A43D 25/183; G01B 11/24; G01B 11/00
See application file for complete search history.

(56) References Cited

U.S. PATENT DOCUMENTS

| 2013/0089677 A1* | 4/2013 | Makover ................ A43D 25/20 427/553 |
| 2015/0190830 A1* | 7/2015 | Regan ................ B05B 13/0221 118/696 |

(Continued)

*Primary Examiner* — Dhaval V Patel
(74) *Attorney, Agent, or Firm* — Birch, Stewart, Kolasch & Birch, LLP

(57) ABSTRACT

A system for determining spraying information used for spraying a 3D object using a spray tool is provided. The system includes a 3D image capturing device and a computing device. The 3D image capturing device is configured to capture a 3D image of the 3D object. The computing device is configured to determine a plurality of border data points of the 3D object based on the 3D image, to determine a plurality of inside points positioned on a surface of the 3D object within a range defined among the border data points according to a spray width with which the spray tool is to spray the 3D object, and to output the border data points and the inside points as the spraying information for spraying the 3D object.

12 Claims, 9 Drawing Sheets

(51) Int. Cl.
 *B05B 12/16* (2018.01)
 *B05D 1/02* (2006.01)

(56) References Cited

U.S. PATENT DOCUMENTS

2015/0290893 A1* 10/2015 Darland .................. A43B 9/12
                                                          427/469
2017/0035153 A1*  2/2017 Snyder ................ A43D 25/183
2020/0120237 A1*  4/2020 Chien .................. A43D 25/183

* cited by examiner

SYSTEM FOR DETERMINING SPRAYING INFORMATION USED FOR SPRAYING A THREE-DIMENSIONAL OBJECT

CROSS-REFERENCE TO RELATED APPLICATION

This application claims priority of Taiwanese Invention Patent Application No. 108123898, filed on Jul. 8, 2019.

FIELD

The disclosure relates to a system for spraying a three-dimensional (3D) object, and more particularly to a system and method for determining spraying information used for spraying a 3D object.

BACKGROUND

A conventional way of gluing a sole to a vamp is to apply adhesive manually. However, manual application of the adhesive may result in non-uniformity and is inefficient.

A conventional automatic spraying system has been developed to spray soles with adhesive by a sprayer to solve the above-mentioned problems, yet the conventional automatic spray system is configured to spray the soles in a single, fixed manner. As Different shoes, and, in turn, the soles thereof, may have different contours and sizes, a fixed spraying manner may not be suitable for all soles.

SUMMARY

Therefore, an object of the disclosure is to provide a system that is for determining spraying information used for spraying a 3D object and that can alleviate at least one of the drawbacks of the prior art.

According to one aspect of the disclosure, a system for determining spraying information used for spraying a 3D object using a spray tool is provided. The system includes a 3D image capturing device and a computing device. The 3D image capturing device is configured to capture a 3D image of the 3D object. The computing device is configured to determine a plurality of border data points of the 3D object based on the 3D image, to select a plurality of border spraying points from the border data points, to determine a plurality of inside points positioned on a surface of the 3D object within a range defined among the border spraying points according to a spray width with which the spray tool is to spray the 3D object, and to output the border spraying points and the inside points as the spraying information for spraying the 3D object.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
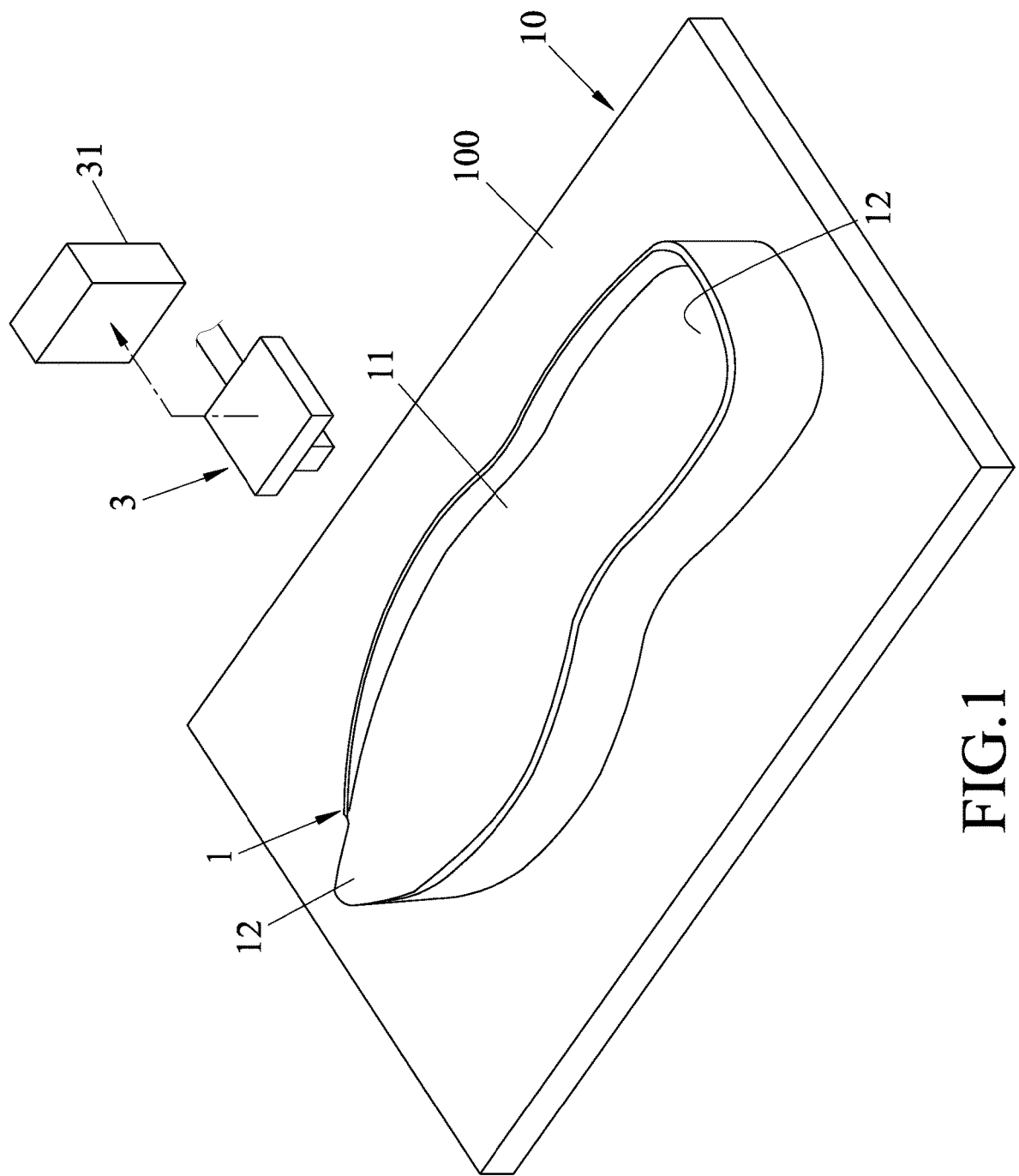
FIG. 1 is a schematic perspective view exemplarily illustrating a system for determining spraying information used for spraying a 3D object according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a system for determining spraying information according to an embodiment of this disclosure is illustrated. The spraying information is used for spraying a three-dimensional (3D) object 1 using a spray tool (not shown). The system includes a platform 10 that has a supporting plane 100 for placing the 3D object 1 thereon, a 3D image capturing device 3 disposed above the platform 10 and configured to capture a 3D image of the 3D object 1, and a computing device 31 configured to determine the spraying information. The computing device 31 is, for example, a computer having a non-transitory memory, and a processing module (e.g., an integrated circuit chip, a programmable logic device, a Programmable Gate Array (PGA), a field-programmable gate array (FPGA), an Application Specific Integrated Circuit (ASIC), etc.) configured to implement operations for obtaining the spraying information.

In the present embodiment, the 3D object 1 is illustrated in FIG. 1 as, but not limited to, a sole of a shoe. Accordingly, the 3D object 1 is defined to include a main part 11 extending in a longitudinal direction of the 3D object 1, and two end parts 12 respectively at opposite ends of the main part 11. The end parts 12 may be defined manually by a user of the system or automatically by the system based on a length of the 3D object 1 in the longitudinal direction. For example, each of the end parts 12 may be defined by the user to have a predetermined length in the longitudinal direction.

Figure 2:
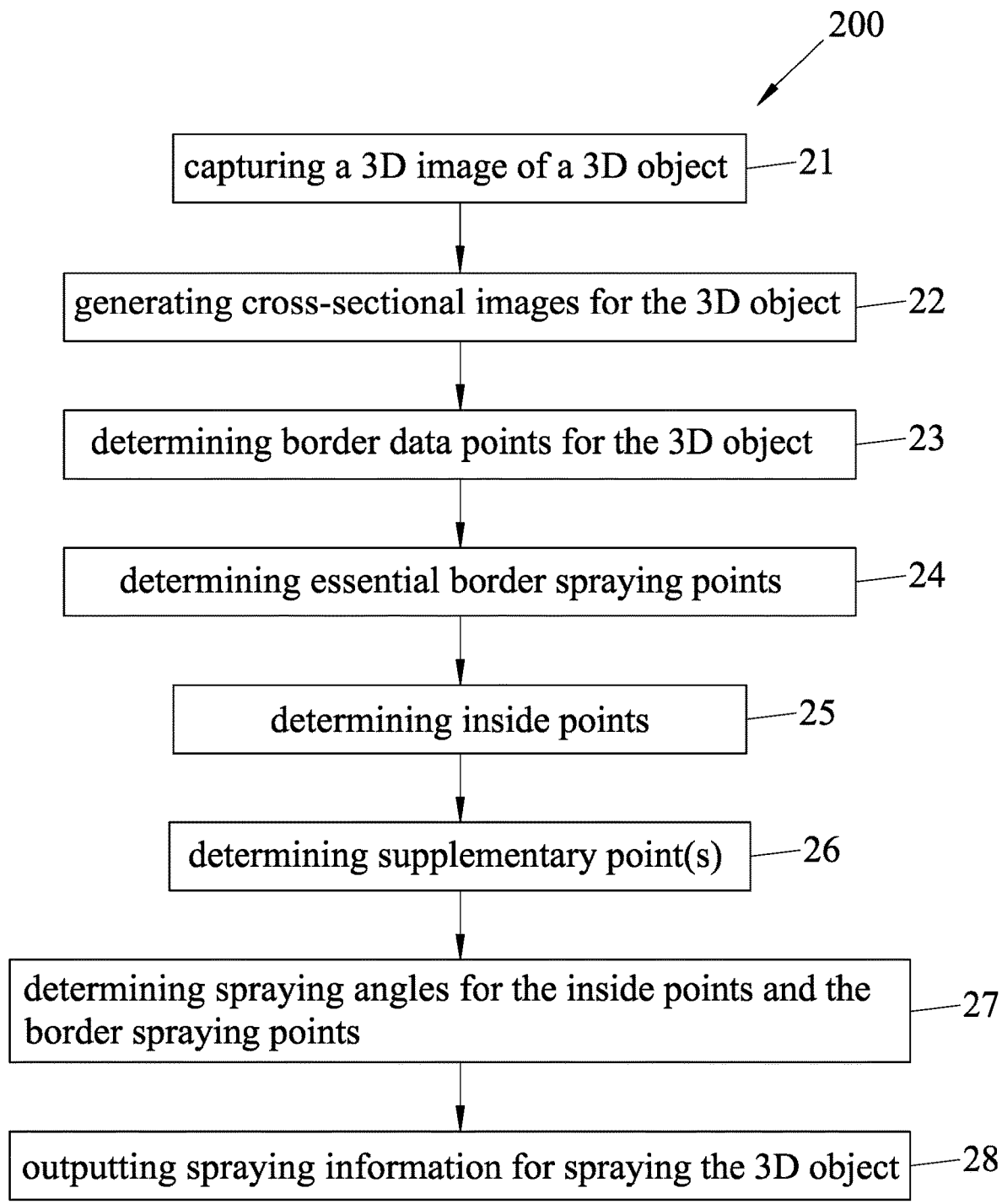
FIG. 2 is a flow chart exemplarily illustrating a method for determining spraying information used for spraying a 3D object according to an embodiment of the disclosure.

Further referring to FIG. 2, a method 200 for determining the spraying information according to one embodiment of this disclosure is implemented by the system of FIG. 1.

In step 21, the 3D image capturing device 3 captures a 3D image of the 3D object 1 that has been placed on the supporting plane 100. It should be noted that the 3D image capturing device 3 is a 3D scanner that can obtain a 3D image of the 3D object 1 with extremely realistic and detailed dimensions and textures of the 3D object 1, and that is not affected by variations in ambient light.

Figure 3:
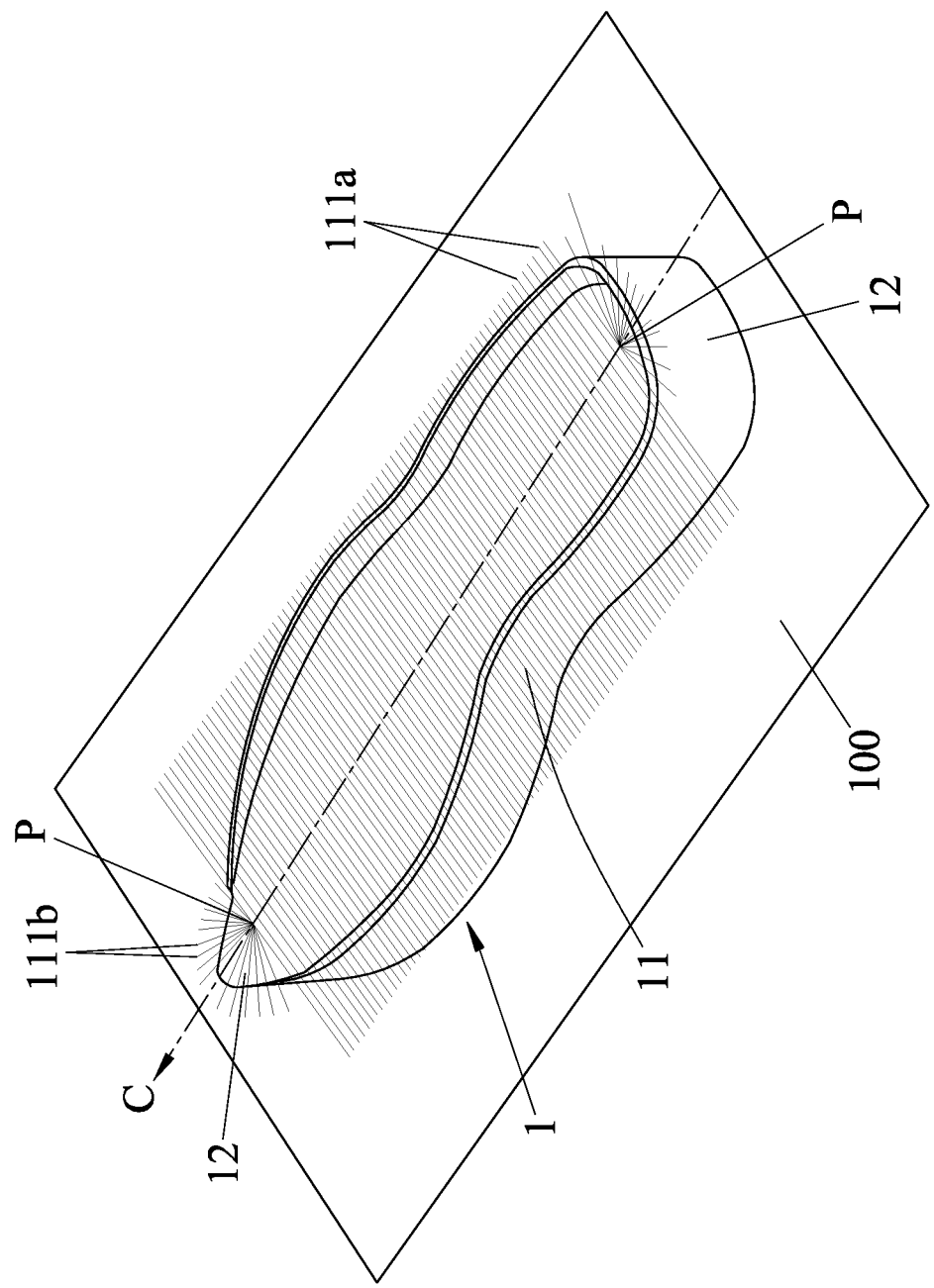
FIG. 3 is a perspective view of the 3D object for illustrating a step of generating a plurality of cross-sectional images of the 3D object according to an embodiment of this disclosure.
Figure 4:
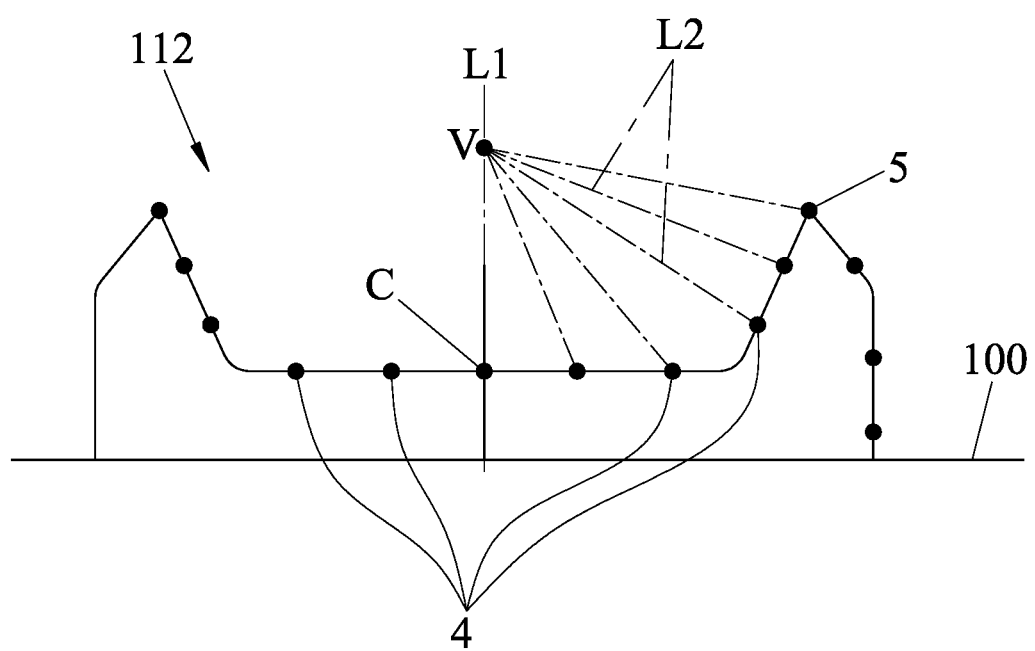
FIG. 4 is a cross-sectional image of the 3D object and illustrates a step of determining a border data point for the cross-sectional image.

Further referring to FIGS. 3 and 4, in step 22, the computing device 31 generates a plurality of cross-sectional images 112 (FIG. 4 depicts only one example) of the 3D object 1 based on the 3D image. Each of the cross-sectional images 112 is taken in a direction perpendicular to the supporting plane 100 (i.e., an up-down direction in FIG. 4).

Specifically, in step 22, the computing device 31 defines an axis (C) extending in the longitudinal direction of the 3D object 1 and passing through the main part 11 and the end parts 12, a plurality of section lines 111a corresponding to the main part 11, and a plurality of section lines 111b corresponding to the end parts 12. For example, the computing device 31 may be configured to take the longest one of imaginary lines that extend through the 3D object 1 in the longitudinal direction as the axis (C). In some embodiments, the axis (C) may be predefined as a center line of the supporting plane 100, and the user has to place the 3D object 1 on the supporting plane 100 in a manner that the longitudinal direction of the 3D object 1 is aligned with the center line of the supporting plane 100. The section lines 111a corresponding to the main part 11 are arranged in a direction perpendicular to the axis (C). For each end part 12, the section lines 111b corresponding thereto are deflected from being perpendicular to the axis (C) in a manner that the section lines 111b are arranged radially with respect to a reference point (P) on the axis (C), as shown in FIG. 3.

The computing device 31 then generates the cross-sectional images 112 of the 3D object 1 taken respectively along the section lines 111a, 111b in directions perpendicular to the supporting plane 100. Accordingly, the cross-sectional images 112 corresponding to the main part 11 are arranged along and perpendicular to the axis (C), while the cross-sectional images 112 corresponding to the end parts 12 are arranged radially with respect to the reference points (P) on the axis (C).

In step 22, for each cross-sectional image 112, the computing device 31 further defines a plurality of candidate points 4 (see FIG. 4) on a contour of a to-be-sprayed surface of the 3D object 1 in the cross-sectional image 112 (e.g., a top surface). The candidate points 4 are spaced apart from each other. A distance between adjacent two of the candidate points 4 could be predetermined or be set manually depending on profiles of the 3D object 1.

In step 23, the computing device 31 determines a plurality of border data points 5 (see FIG. 4) of the 3D object 1 based on the cross-sectional images 112 obtained from the 3D image.

Specifically, for each cross-sectional image 112, the computing device 31 defines a vertical line (L1) extending through the axis (C) and perpendicular to the supporting plane 100, defines a view point (V) on the vertical line (L1), computes for each of the candidate points 4 an imaginary angle between the vertical line (L1) and an imaginary line (L2) connecting the view point (V) and the candidate point 4, and designates one of the candidate points 4 having the largest imaginary angle as the border data point 5 for the cross-sectional image 112. For example, the computing device 31 is configured to define a point on the vertical line (L1) having a predetermined distance from the axis (C) as the view point (V).

It is noted that, in this embodiment, for each of the cross-sectional images 112 corresponding to the main part 11, step 23 should be implemented from both sides (e.g., from left and right sides of FIG. 4) so as to determine two border data points 5 for the cross-sectional image 112. As for each of the cross-sectional images 112 corresponding to the end parts 12, step 23 is implemented only once to determine one border data point 5 for the cross-sectional image 112. In other embodiments, each of the section lines 111a (see FIG. 3) corresponding to the main part 11 extends outwardly from the axis (C) in either a right or a left direction and is perpendicular to the axis (C), such that, in step 23, only one border data point 5 will be determined for each of the cross-sectional images 112 corresponding to the main part 11. Essentially, step 23 is to select, for each of the cross-sectional images 112, at least one of the candidate points 4 as one of the border data points 5.

Figure 5:
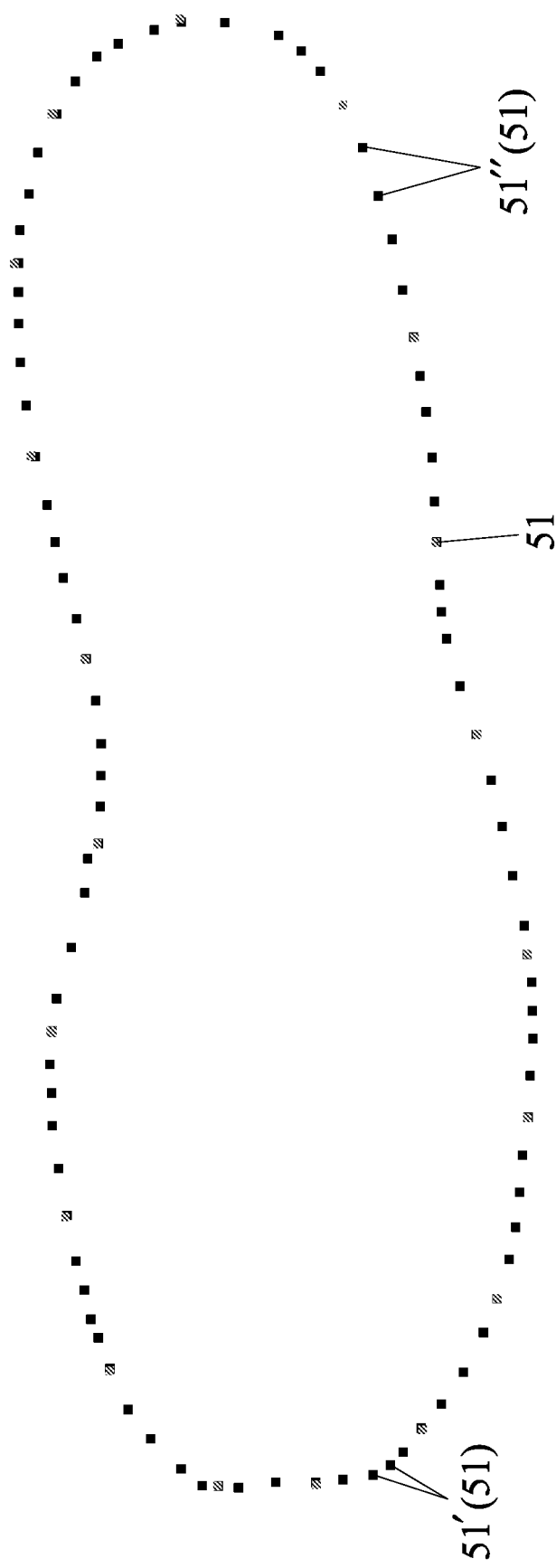
FIG. 5 is a schematic view exemplarily illustrating a plurality of border spraying points selected from a plurality of border data points that define an imaginary perimeter of the 3D object.

Referring further to FIG. 5, in step 24, the computing device 31 further selects a plurality of border spraying points 51 from among the border data points 5. The border spraying points 51 are the points needing to be sprayed, and are selected from the border data points 5 based on dimensional parameters of an imaginary perimeter that is defined by connecting the border data points 5 of all the cross-sectional images 112, and/or based on experience. For example, the dimensional parameters of the imaginary perimeter may be related to a shape of the 3D object 1, a length of the imaginary perimeter, etc. For example, a total number of the border spraying points 51 is determined based on the imaginary perimeter, and the border spraying points 51 include a plurality of first border spraying points 51' and a plurality of second border spraying points 51". The border spraying points 51 may be selected by the following steps: (1) for each border data point 5 (referred to as a candidate data point 5), when a distance from the candidate data point 5 to a line connecting two other of the border data points 5 that are immediately adjacent to and sandwich the candidate data point 5 is greater than a preset value, designating the candidate data point 5 as a first border spraying point 51'; (2) calculating a predetermined number by rounding a quotient of a first number (a total number of the border data points 5 minus a total number of the first border spraying points 51') by a second number (the total number of the border spraying points 51 minus the total number of the first border spraying points 51') to an integer that serves as the predetermined number; and (3) selecting the second border spraying points 51" in a manner that every adjacent two of the second border spraying points 51" are spaced apart from each other by the predetermined number of the border data points 5 (i.e., the predetermined number of the border data points 5 serve as an interval between any adjacent two second border spraying points 51"). In some embodiments, the total number of the border spraying points 51 is predefined by the user of the system, and may be modified according to the effect of spraying the border spraying points 51. In further embodiments, rather than predefining the total number of the border spraying points 51 and calculating the predetermined number in step (2), the user of the system may predefine the predetermined number so that step (2) may be skipped.

It should be noted that, in other embodiments, the border spraying points 51 may be selected by the following steps: first selecting the second border spraying points 51" from among the boarder data points 5 in a manner that every adjacent two of the second border spraying points 51" are spaced apart from each other by a predetermined number of the border data points 5; and for each border data point 5 that has not been selected as the second border spraying point 51" (referred to as a candidate data point 5), when a distance from the candidate data point 5 to a line connecting two other of the border data points 5 that are immediately adjacent to and sandwich the candidate data point 5 is greater than a preset value, designating the candidate data point 5 as a first border spraying point 51'.

Figure 6:
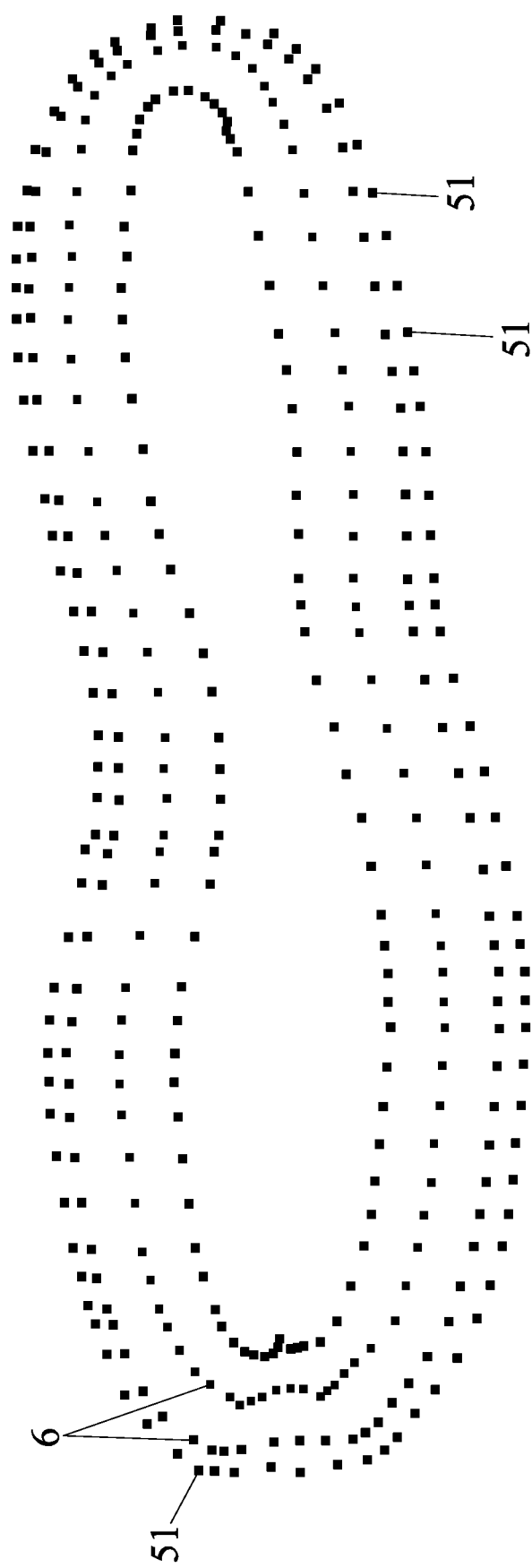
FIG. 6 is a schematic view exemplarily illustrating inside points within a range defined among the border spraying points.
Figure 7:
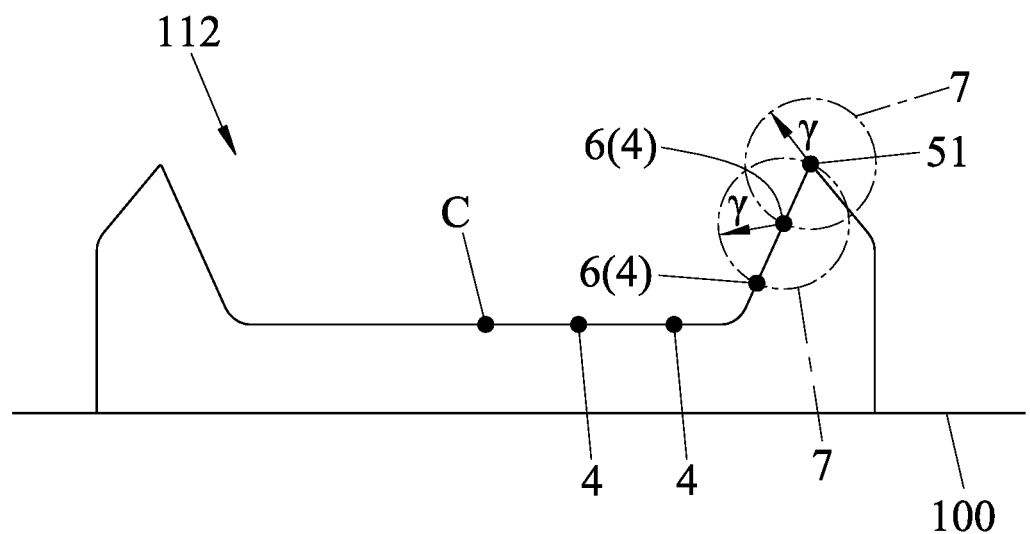
FIG. 7 is a cross-sectional image of the 3D object and illustrates a step of determining inside points by scanning the candidate points.

Further referring to FIGS. 6 and 7, in step 25, for each border spraying points 51, the computing device 31 also identifies a plurality of inside points 6 from the candidate points 4 on the corresponding cross-sectional image 112, by scanning the candidate points 4 between the border spraying point 51 and the axis (C) with a scanning width ($\gamma$) related to a spray width with which the spray tool is to spray the 3D object 1. In some embodiments, the scanning width ($\gamma$) is fixed; in other embodiments, the scanning width ($\gamma$) may be varying. For example, when the computing device 31 scans the candidate points 4 near the border spraying point 51, the scanning width is smaller than that when the computing device 31 scans the candidate points 4 near the axis (C).

In this embodiment, for each of the border spraying points 51 corresponding to the main part 11, step 25 should be implemented from both sides (e.g., from left and right sides of FIG. 4) of the cross-sectional image 112, each time using the corresponding one of the two border spraying points 51 as the reference for scanning. As for each of border spraying points 51 corresponding to the end parts 12, step 25 is implemented only once as there is only one border spraying point 51 for the cross-sectional image 112. Essentially, step 25 of the method is to determine a plurality of inside points 6 positioned on a surface of the 3D object 1 that is within a range defined by the imaginary perimeter (i.e., defined among the border data points 5) according to the spray width with which the spray tool is to spray the 3D object 1.

Specifically, the computing device 31 identifies the inside points 6 by the following sub-steps:

First, a point of intersection of an imaginary circle 7 and the contour of the to-be-sprayed surface of the 3D object 1 in the cross-sectional image 112 is found, where the imaginary circle 7 is defined on the cross-sectional image 112 with the border spraying point 51 as a center thereof and the scanning width ($\gamma$) as a radius thereof.

Second, one of the candidate points 4 that is within a default range from and closest to the point of intersection that was most recently found may be identified as an inside point 6.

Then, another imaginary circle 7 is defined with the inside point 6 that was most recently identified as a center of said another imaginary circle 7, and one of the candidate points 4 that is closest to the point of intersection of said another imaginary circle 7 and the contour of the cross-sectional image 112 is identified as another inside point 6. The above-mentioned sub-steps are recursively repeated until the point of intersection that is currently found is beyond the axis (C).

Figure 8:
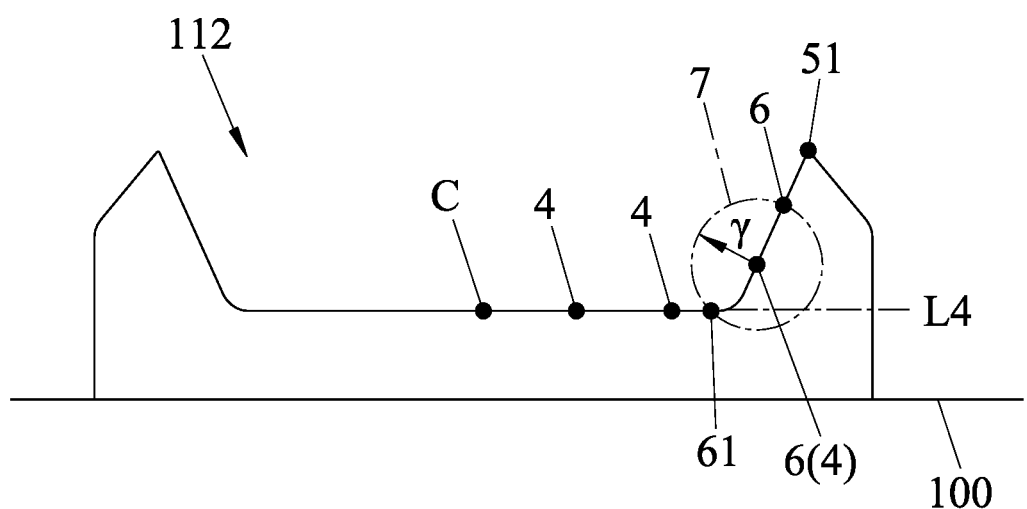
FIG. 8 is a cross-sectional image of the 3D object and illustrates a step of determining a supplementary point.

Referring to FIG. 8, when no candidate point 4 is found within the default range from the point of intersection, the computing device 31 implements step 26. In step 26, the computing device 31 executes line fitting to obtain a straight fitting line (L4) that best fits those of the candidate points 4 that are within a predetermined distance from the imaginary circle 7, and then takes a point of intersection of the imaginary circle 7 and the fitting line (L4) as a supplementary point 61.

Figure 9:
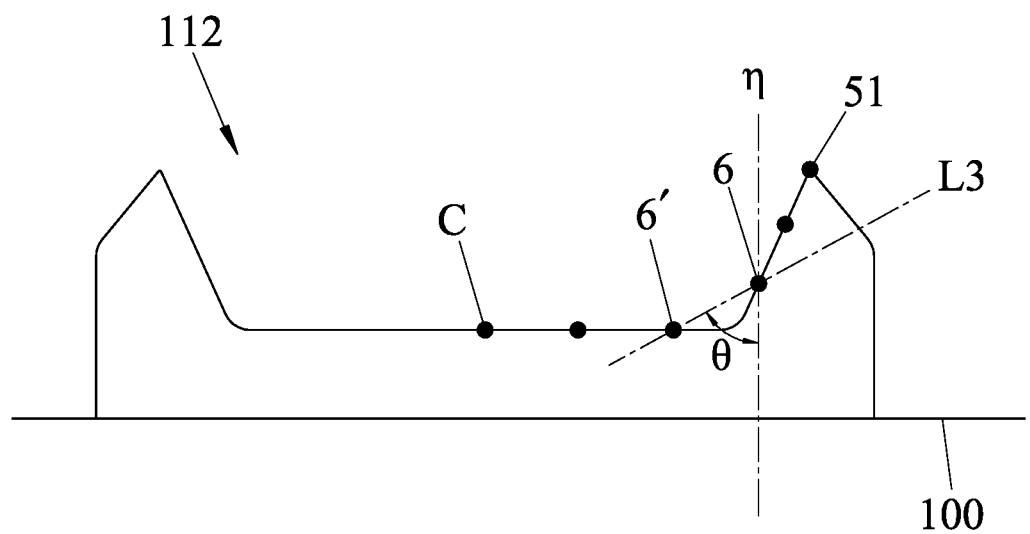
FIG. 9 is a cross-sectional image of the 3D object and illustrates a step of computing an included angle between a contiguous straight line and a vertical line.

Referring to FIG. 9, in step 27, the computing device 31 determines, for each of the inside points 6 and the border spraying points 51, an angle at which the spray tool is to spray the inside point 6 (also referred to simply as "spraying angle"). Specifically, taking one of the inside points 6 as an example, the computing device 31 connects the inside point 6 with an adjacent inside point 6' that is immediately adjacent to the inside point 6 to form a contiguous straight line (L3), computes an included angle ($\theta$) between the contiguous straight line (L3) and a vertical line ($\eta$) passing through the inside point 6 and perpendicular to the supporting plane 100, and determines a spraying angle for the inside point 6 from a look-up table based on the included angle ($\theta$). Said look-up table is established previously and may be different for different practical applications, and is stored in the non-transitory memory of the computing device 31. For example, the spraying angle is 45° when the included angle ($\theta$) is in a range of 0-30°, is 30° when the included angle ($\theta$) is in a range of 31-45°, is 20 when the included angle ($\theta$) is in a range of 46-75, and is 10° when the included angle ($\theta$) is in a range of 76-90°.

In step 28, the computing device 31 outputs, to the spray tool, the border spraying points 51, the inside points 6, the spraying angles corresponding respectively to the inside points 6 and the border spraying points 51, and/or the supplementary point(s) 61 as the spraying information for spraying the 3D object 1. Accordingly, the spray tool may spray the 3D object 1 based on the spraying information.

In sum, the system according to some embodiments of this disclosure is capable of determining the border data points 5 based on the cross-sectional images 112 of the 3D object 1, followed by identifying the border spraying points 51 on the imaginary perimeter of the 3D object 1 from the border data points 5, identifying the inside points 6, and determining the angles at which to spray the inside points 6. The border spraying points 51 and the inside points 6 thus identified are arranged on the surface of the 3D object 1 that is to be sprayed in such a way as to ensure that the spraying achieves an effective result (for example, when spraying an adhesive material onto a shoe sole, the arrangement of the border spraying points and the inside points can achieve effective adhesion of the sole onto a vamp).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A system for determining spraying information used for spraying a three-dimensional (3D) object using a spray tool, said system comprising:
   a 3D image capturing device configured to capture a 3D image of the 3D object;
   a computing device configured to determine a plurality of border data points of the 3D object based on the 3D image, to select a plurality of border spraying points from among the border data points, to determine a plurality of inside points positioned on a surface of the 3D object within a range defined among the border spraying points according to a spray width with which the spray tool is to spray the 3D object, and to output the border spraying points and the inside points as the spraying information; and a platform that has a supporting plane for placing the 3D object thereon;

wherein said computing device is further configured to generate, based on the 3D image, a plurality of cross-sectional images of the 3D object each taken in a direction perpendicular to the supporting plane, and to determine the border data points based on the cross-sectional images, wherein said computing device is configured to select the plurality of border spraying points from the border data points based on dimensional parameters of an imaginary perimeter defined by connecting the border data points of all the cross-sectional images.

2. The system as claimed in claim 1, wherein said computing device is configured to select the plurality of border spraying points in a manner that every adjacent two of the border spraying points are spaced apart from each other by a predetermined number of the border data points.

3. The system as claimed in claim 1, wherein said computing device is configured to select the plurality of border spraying points by, for each of the border data points, when a distance from the border data point to a line connecting two other of the border data points that are immediately adjacent to and sandwich the border data point is greater than a preset value, designating the border data point as one of the border spraying points.

4. The system as claimed in claim 1, wherein said computing device is configured to generate the cross-sectional images in a manner that at least a portion of the cross-sectional images are perpendicular to an axis extending in a longitudinal direction of the 3D object.

5. The system as claimed in claim 1, wherein said computing device is configured to generate the cross-sectional images in a manner that a portion of the cross-sectional images corresponding to an end part of the 3D object are deflected from being perpendicular to an axis in such a way that the portion of the cross-sectional images are arranged radially with respect to a point on the axis, wherein the axis extends in a longitudinal direction of the 3D object.

6. The system as claimed in claim 1, wherein, for each of the cross-sectional images, said computing device is further configured to define a plurality of candidate points on a contour of a to-be-sprayed surface of the 3D object in the cross-sectional image, where the candidate points are spaced apart from each other, and to select at least one of the candidate points as one of the border data points.

7. The system as claimed in claim 6, wherein, for each of the cross-sectional images, said computing device is further configured to define a vertical line extending through an axis and perpendicular to the supporting plane, where the axis extends in a longitudinal direction of the 3D object, to define a view point on the vertical line, to compute, for each of the candidate points, an imaginary angle between the vertical line and an imaginary line connecting the view point and the candidate point, and to designate one of the candidate points having the largest imaginary angle as the border data point for the cross-sectional image.

8. The system as claimed in claim 7, wherein, for each of the border spraying points, said computing device is configured to, on the corresponding cross-sectional images, identify ones of the candidate points as the inside points by scanning the candidate points between the border spraying point and the axis with a scanning width related to the spray width.

9. The system as claimed in claim 8, wherein said computing device is configured to identify the inside points by steps of:

finding a point of intersection of an imaginary circle and the contour of the to-be-sprayed surface of the 3D object in the cross-sectional image, where the imaginary circle is defined on the cross-sectional image with the border spraying point as a center thereof;

identifying one of the candidate points that is within a default range from and closest to the point of intersection most recently found as an inside point; and recursively repeating the step of defining an imaginary circle with the inside point that is last identified as a center of the imaginary circle and the step of identifying one of the candidate points until the point of intersection most recently found is beyond the axis.

10. The system as claimed in claim 9, wherein, when no candidate point is found within the default range from the point of intersection, said computing device is further configured to execute line fitting to obtain a straight fitting line that best fits those of the candidate points that are within a predetermined distance from the imaginary circle, and then to make a point of intersection of the imaginary circle and the fitting line serve as a supplementary point.

11. A system for determining spraying information used for spraying a three-dimensional (3D) object using a spray tool, said system comprising:

a 3D image capturing device configured to capture a 3D image of the 3D object; and a computing device configured to determine a plurality of border data points of the 3D object based on the 3D image, to select a plurality of border spraying points from among the border data points, to determine a plurality of inside points positioned on a surface of the 3D object within a range defined among the border spraying points according to a spray width with which the spray tool is to spray the 3D object, and to output the border spraying points and the inside points as the spraying information;

wherein said computing device is configured to determine the inside points by scanning, from one of the border spraying points in the cross-sectional image with a scanning width related to the spray width, a plurality of candidate points that are on a contour of a to-be-sprayed surface of the 3D object in the cross-sectional image and that are spaced apart from each other.

12. A system for determining spraying information used for spraying a three-dimensional (3D) object using a spray tool, said system comprising:

a 3D image capturing device configured to capture a 3D image of the 3D object; and a computing device configured to determine a plurality of border data points of the 3D object based on the 3D image, to select a plurality of border spraying points from among the border data points, to determine a plurality of inside points positioned on a surface of the 3D object within a range defined among the border spraying points according to a spray width with which the spray tool is to spray the 3D object, and to output the border spraying points and the inside points as the spraying information;

wherein said computing device is further configured to, for each of the inside points and the border spraying points:
define a straight contiguous line by connecting the point with an adjacent one of the inside points that is immediately adjacent thereto;
compute an included angle between the straight contiguous line and a vertical line passing through the point;
determine a spraying angle for the point from a look-up table according to the included angle; and
output the spraying angle as part of the spraying information.

* * * * *